United States Patent Office 3,236,565
Patented Feb. 22, 1966

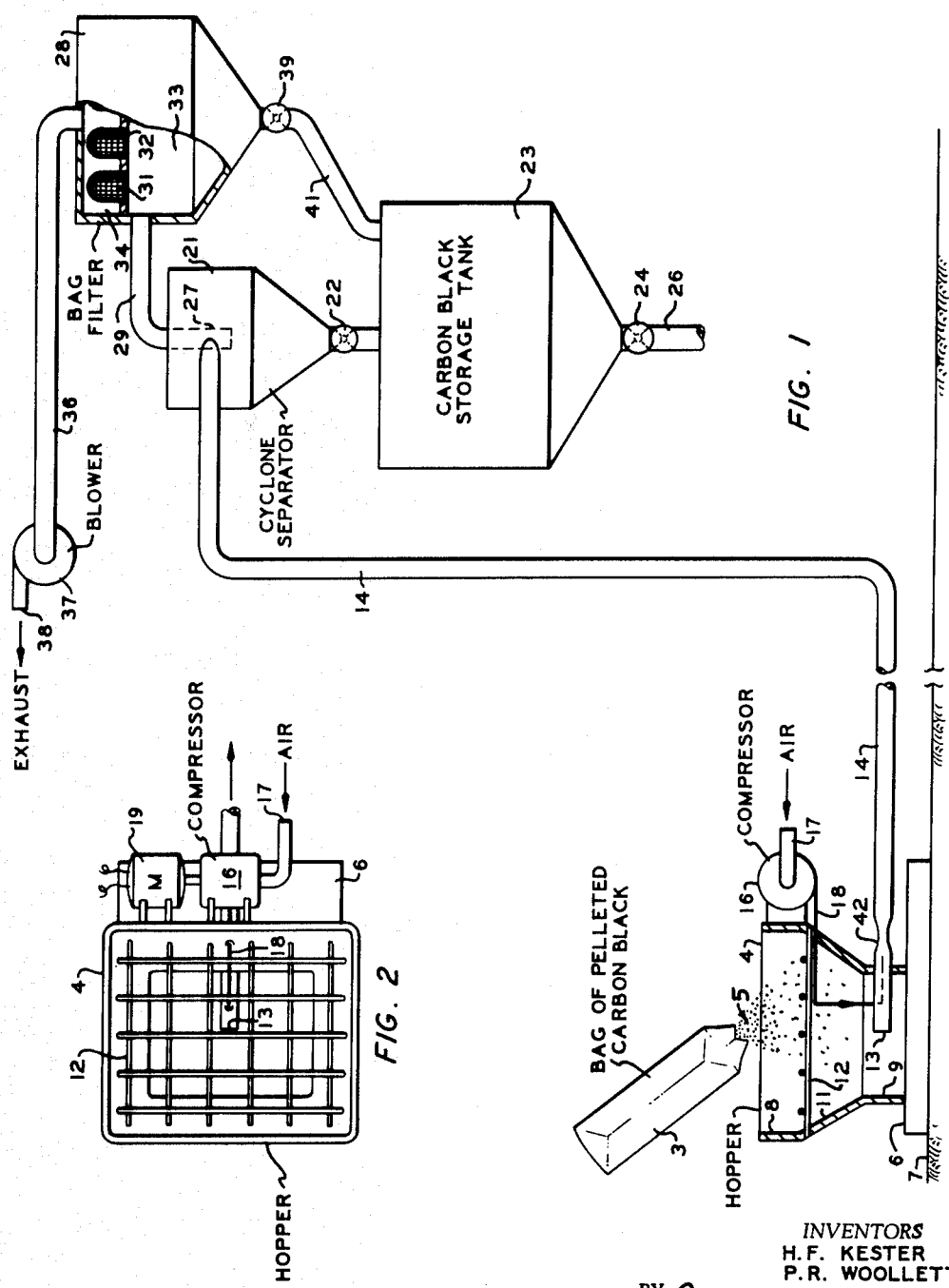

3,236,565
DUSTLESS PNEUMATIC CONVEYOR
AND PROCESS
Harry F. Kester and Paul R. Woollett, Orange, Tex., assignors to Phillips Petroleum Company, a corporation of Delaware
Filed Dec. 31, 1963, Ser. No. 334,836
5 Claims. (Cl. 302—17)

This invention relates to a novel pneumatic conveyor for finely divided solids and to a process of conveying such materials. In another aspect, it relates to salvaging carbon black from paper sacks and storing the same for further use. In another aspect, it relates to minimizing the dust in the air due to unloading, conveying, and loading operations.

In the prior art, when carbon black pellets or flocculent carbon black, either loose or sacked in sealed paper bags, is to be rerun, it is dumped or shoveled into a hopper leading to a conventional pneumatic conveying system and conveyed by air under pressure to a surge tank. The reasons for rerunning or reworking carbon black are many, such as accidental spillage, a change in the specifications by the company ordering the same, or lack of demand for carbon black of certain specifications which can be reworked to meet new specifications. In the prior art hoppers and receiving tanks, considerable leakage of air under pressure occurs back through the hopper, or out of the tank, carrying carbon black dust into the air of the room. This carbon black dust is a great nuisance, getting everything and everybody in the room very dirty.

In the present invention this nuisance is substantially abated by injecting the compressed conveying air into the conveying conduit in a downstream direction, preferably axially in the throat of or adjacent and upstream of a venturi in the conveying pipe at a point adjacent the point of connection of said pipe to the hopper to create a suction from said hopper into said pipe which draws air-suspended dust from said hopper into said pipe. Also, by separating a major portion of said carbon black or other fine solids from the conveying air in a cyclone separator, having a solids bottom outlet leading to a surge tank or storage tank and a gas top outlet leading to the lower chamber of a bag filter, which bag filter filters out substantially all the remaining fine solids and passes them out the bottom to said surge tank by gravity flow, while the purified air is drawn out of the top of the bag filter into the atmosphere by an air blower, leakage of carbon black dust into the atmosphere from the other end of the system is substantially eliminated. Said air blower also reduces the pressure in the entire system back to and including the hopper sufficient to entrain all said injected compressed air, so that any dust created in dumping fine solids into the hopper is substantially all drawn into the conveying pipe and does not pass into the atmosphere, because none of said injected compressed air ever blows back into the hopper.

One object of this invention is to provide a novel system or apparatus for the dustless collection, conveying, and/or storage of carbon black or other fine solids.

Another object is to provide a process for the dustless collection, conveying, and/or storage of such fine solids.

Numerous other objects and advantages will be apparent to those skilled in the art upon reading the accompanying specification, claims and drawings.

FIGURE 1 is an elevational view of a system embodying the present invention.

FIGURE 2 is a plan view of the left-hand portion of FIGURE 1.

In FIGURE 1 a bag of carbon black 3 is shown being emptied into hopper 4 of the present invention. The flowing carbon black or other fine solids from bag 3 is generally designated as 5. Hopper 4 comprises base 6 which may be mounted or supported on floor 7. Hopper 4 may be circular (not shown) in cross section, but it is preferred to make it rectangular or square, as shown, and consists of two vertical walled sections 8 and 9 separated by a frusto pyramidal or frusto conical section 11. It is preferred to have a screen 12 in hopper 4 to prevent the paper of bag 3 from blocking the entrance 13 of conveying tube 14. Screen 12 has much larger openings than the average size of the carbon black particles 5 coming from bag 3.

Mounted adjacent hopper 4 is an air compressor 16 drawing air from the atmosphere through compressor intake conduit 17 and discharging compressed air through outlet conduit 18. Air compressor 16 can be driven by any suitable means, such as electric motor 19.

Pneumatic conveying conduit 14 at the other downstream end passes tangentially into a conventional cyclone separator 21. Due to centrifugal force and the reduction of velocity of the gas in passing into a larger chamber, the major portion of the carbon black being supported through conduit 14 separates from the gas in cyclone separator 21 and passes out the bottom through star valve 22 into carbon black storage tank 23 from which it may be withdrawn by gravity when desired, upon operation of star valve 24 through dispensing line 26.

The conveying air, from which most of the carbon black has been removed, passes axially out of cyclone 21 through central outlet pipe 27 which has an open end preferably located below the pointed entry of pipe 14.

The gas in pipe 27 passes into the lower section of bag filter 28 through conduit 29 and then through fabric filter bags 31 and 32 from lower chamber 33 into upper chamber 34, from which it is drawn through conduit 36 by air blower 37 which discharges it to the atmosphere through outlet 38. The size of air blower 37 is selected so that it is large enough to reduce the pressure in pipe 36, chambers 33 and 34, conduit 29, cyclone separator 21, conduit 14, and hopper 4 sufficiently so that any dust produced by dumping carbon black pellets from bag 3 into hopper 4 will be drawn into outlet 13 instead of passing upward into the air of the room.

The size of the openings in filters 31 are smaller than the average size of the fine solids 5 that may be carried over to chamber 33 by gas outlet conduit 29, so that very little carbon black, if any, is suspended in the gas in chamber 34.

Loose carbon black collected in chamber 33 passes by gravity through star valve 39 and conduit 41 into the carbon black storage tank 23.

Air from compressor 16 passing through conduit 18 is discharged axially downstream through the throat of venturi 42 into conduit 14.

The process of minimizing dust in the air due to unloading, conveying, and loading operations is accomplished by running both air compressor 16 and air blower 37, breaking open bags 3 and dumping the fine solid material, such as carbon black, to be supported into hopper 4, and entraining the carbon black through inlet 13 aided by suction from the jet of compressed air being injected from 18 through venturi 42 downstream of conduit 14, and by blower 37 reducing the pressure in the system all the way back to inlet 13. In this manner any dust which tends to form in hopper 4 is drawn into inlet 13 and kept out of the atmosphere, as bag filter 28 removes substantially all the fine solids remaining in the air in 29 after it has passed through cyclone separator 21.

A modified form of this invention (not shown in the drawing) can be made by eliminating cyclone separator 21, detaching its lower conduit to carbon black storage tank 23 and closing the opening in said tank left by detaching said lower conduit, and connecting conduit 14 directly to conduit 29. This modified form of the invention is operative in carrying out all the functions of the invention shown in the drawing, but is not preferred because it throws all of the load of separating the finely divided solids 5 from the gas in conduit 36 on the bag filter 28 alone, which then has to be much larger and more expensive, whereas in the preferred form shown in the drawing a substantial portion of the finely divided solids are separated in a relatively less expensive cyclone separator 21 and pass through valve 22 directly into storage tank 23.

While a specific embodiment of the invention has been shown for purposes of illustration, it is obvious that the invention is not limited thereto.

Having described our invention, we claim:

1. A conveying system for finely divided solids comprising in combination, a hopper having an inlet and an outlet and a screen with much larger openings than the average size of said solids disposed to regulate passage between said inlet and outlet, a cyclone separator having a generally cylindrical chamber having a tangential inlet, an axial lower outlet, a valve disposed to control flow through said lower outlet, and an axial upper outlet, a bag filter having a first and second chamber separated by a filter with at least smaller openings than the average size of said finely divided solids, an inlet and an outlet to said first chamber, and an outlet to said second chamber, and a valve in said outlet to said first chamber disposed to control flow therethrough, a storage tank having a lower outlet and a valve in said last lower outlet disposed to control flow therethrough, a first conduit connecting the outlet of said hopper with the tangential inlet of said cyclone separator, a venturi constriction in said first conduit, an air compressor having a second outlet conduit disposed to discharge air axially downstream in said first conduit at a point adjacent and upstream of said venturi, a third conduit connecting the lower outlet of said cyclone separator with said storage tank, a fourth conduit connecting the upper axial outlet of said cyclone separator with the inlet to said first chamber, a fifth conduit connecting the outlet of said first chamber with said storage tank, an air blower having an inlet and an outlet, and a sixth conduit connecting the outlet of said second chamber with the inlet of said air blower.

2. A conveying system for finely divided solids comprising in combination, a hopper having an inlet and an outlet, a cyclone separator having a generally cylindrical chamber having a tangential inlet, an axial lower outlet, a valve disposed to control flow through said lower outlet, and an axial upper outlet, a bag filter having a first and second chamber separated by a filter with at least smaller openings than the average size of said finely divided solids, an inlet and an outlet to said first chamber, and an outlet to said second chamber, and a valve in said outlet to said first chamber disposed to control flow therethrough, a storage tank having a lower outlet and a valve in said last lower outlet disposed to control flow therethrough, a first conduit connecting the outlet of said hopper with the tangential inlet of said cyclone separator, a venturi constriction in said first conduit, an air compressor having a second outlet conduit disposed to discharge air axially downstream in said first conduit at a point adjacent and upstream of said venturi, a third conduit connecting the lower outlet of said cyclone separator with said storage tank, a fourth conduit connecting the upper axial outlet of said cyclone separator with the inlet to said first chamber, a fifth conduit connecting the outlet of said first chamber with said storage tank, an air blower having an inlet and an outlet, and a sixth conduit connecting the outlet of said second chamber with the inlet of said air blower.

3. A conveying system for finely divided solids comprising in combination, a hopper having an inlet and an outlet, a cyclone separator having a generally cylindrical chamber having a tangential inlet, an axial lower outlet, a valve disposed to control flow through said lower outlet, and an axial upper outlet, a bag filter having a first and second chamber separated by a filter with at least smaller openings than the average size of said finely divided solids, an inlet and an outlet to said first chamber, and an outlet to said second chamber, and a valve in said outlet to said first chamber disposed to control flow therethrough, a storage tank, a first conduit connecting the outlet of said hopper with the tangential inlet of said cyclone separator, a venturi constriction in said first conduit, an air compressor having a second outlet conduit disposed to discharge air axially downstream in said first conduit at a point adjacent and upstream of said venturi, a third conduit connecting the lower outlet of said cyclone separator with said storage tank, a fourth conduit connecting the upper axial outlet of said cyclone separator with the inlet to said first chamber, a fifth conduit connecting the outlet of said first chamber with said storage tank, an air blower having an inlet and an outlet, and a sixth conduit connecting the outlet of said second chamber with the inlet of said air blower.

4. A conveying system for finely divided solids comprising in combination, a hopper having an inlet and an outlet, a cyclone separator having a generally cylindrical chamber having a tangential inlet, an axial lower outlet, and an axial upper outlet, a bag filter having a first and second chamber separated by a filter with at least smaller openings than the average size of said finely divided solids, an inlet and an outlet to said first chamber, and an outlet to said second chamber, a storage tank, a first conduit connecting the outlet of said hopper with the tangential inlet of said cyclone separator, a venturi constriction in said first conduit, an air compressor having a second outlet conduit disposed to discharge air axially downstream in said first conduit at a point adjacent and upstream of said venturi, a third conduit connecting the lower outlet of said cyclone separator with said storage tank, a fourth conduit connecting the upper axial outlet of said cyclone separator with the inlet to said first chamber, a fifth conduit connecting the outlet of said first chamber with said storage tank, an air blower having an inlet and an outlet, and a sixth conduit connecting the outlet of said second chamber with the inlet of said air blower.

5. A conveying system for finely divided solids comprising, in combination, a hopper having an inlet and an outlet, a bag filter having a first and second chamber separated by a filter with at least smaller openings than the average size of said finely divided solids, an inlet and an outlet to said first chamber, an outlet to said second chamber, a storage tank, a first conduit connecting the outlet of said hopper with the inlet to said first chamber, a venturi constriction in said first conduit, an air compressor having a second outlet conduit disposed to discharge air axially downstream in said first conluit at a point adjacent and upstream of said venturi, a third conduit connecting said first chamber and said storage tank, an air blower having an inlet and an outlet, and a fourth conduit connecting the outlet of said second chamber with the inlet of said air blower.

References Cited by the Examiner

UNITED STATES PATENTS

| 1,970,405 | 8/1934 | Thomas | 302—51 |
| 2,026,732 | 1/1936 | Farley | 302—36 |
| 2,276,805 | 3/1942 | Tolman | 302—59 |

FOREIGN PATENTS 212,893  2/1958  Australia.

SAMUEL F. COLEMAN, *Primary Examiner.*

ANDRES H. NIELSEN, *Examiner.*